March 1, 1966  J. B. ERIKSEN  3,237,750
MEANS FOR POSITIONING FISH
Filed Oct. 10, 1963
FIG.1
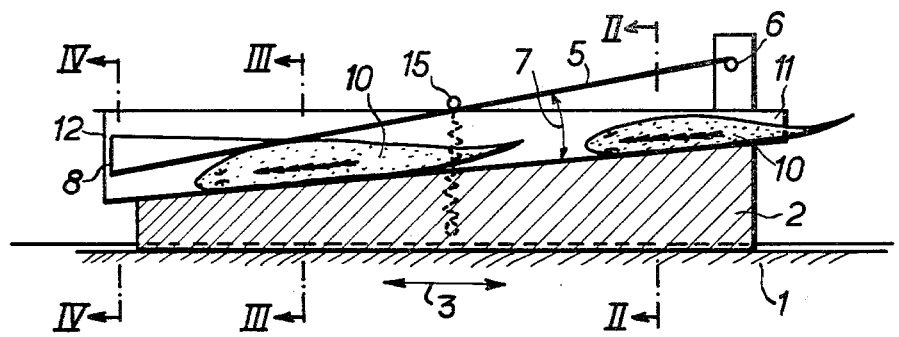
FIG.4  FIG.3  FIG.2
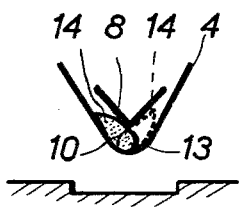 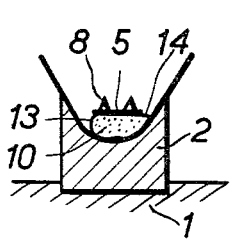 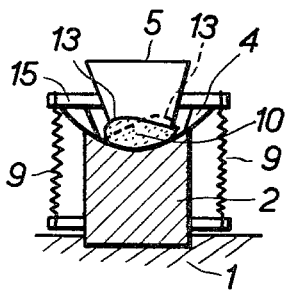
INVENTOR
JAN BERGH ERIKSEN
BY  Irwin S. Thompson
ATTORNEY

United States Patent Office 3,237,750
Patented Mar. 1, 1966

3,237,750
MEANS FOR POSITIONING FISH
Jan Bergh Eriksen, Stavanger, Norway, assignor to Trio Fabrikker A/S de Forenede Norske Laase-OG Beslagfabriker, Stavanger, Norway
Filed Oct. 10, 1963, Ser. No. 315,160
Claims priority, application Norway, Oct. 13, 1962, 146,066
3 Claims. (Cl. 198—33)

The present invention relates to means for positioning fish so that the belly of the fish may be placed in a predetermined position in relation to the other fishes, comprising a reciprocable conduit inclined downwardly towards the outlet end, the cross sectional shape of the conduit converging towards said end.

With means of this type it is possible to position the fish on edge, but it is not certain whether the fish will have its belly in a desired direction.

The object of the invention is to provide means of the above mentioned kind in which this disadvantage is avoided and in which the fish will be placed with the belly in the desired direction, in this case upwards.

This is in accordance with the invention achieved by means of a guide plate which is located above the conduit and is urged towards the bottom of same by a spring force, the plate having an increasing pointed V-shape with the pointed edge directed towards the bottom of the conduit.

In this manner the back of the fish, which is wider and less deformable, will be forced towards the bottom of the conduit, while the narrower and more resilient belly portion will be pressed up between the side wall of the conduit and the outer face of the V-shaped guide plate.

One embodiment of the invention will be described more closely with reference to the drawing.

FIGURE 1 is a longitudinal section through means according to the invention, in which the inlet end is to the right hand side of the drawing and the outlet is located to the left.

FIGURE 2 is a section taken along the line II—II on FIGURE 1.

FIGURE 3 is a section taken along the line III—III on FIGURE 1.

FIGURE 4 is a section taken along the line IV—IV on FIGURE 1.

A holder 2 is reciprocable on a support 1 as indicated by the arrow 3. The holder 2 supports a conduit 4 which is inclined downwardly from the inlet end 11 to the outlet end 12 and has a cross sectional shape which converges toward the outlet end 12. A guide plate 5 is pivotably supported above the conduit 4 and may pivot on a shaft 6 which is rigidly connected to the holder 2. The guide plate 5 is pressed by means of two springs 9 of which one end is connected to a rod 15 on the guide plate 5, said rod extending outwardly from each side of the plate and being supported by the edges of the conduit, while the other end is connected to the holder 2. In this manner the conduit and the guide plate will form an angle as indicated at 7. The guide plate 5, towards the outlet end, is formed in an increasingly pointed V-shape 8, the pointed edge of which is directed towards the bottom of the conduit. As a result of the reciprocating motion and the inclination of the conduit, fish 10 which are introduced at the inlet end 11 will move towards the outet end 12. Before the fish contact the guide plate 5 the fish will lie on the bottom of the conduit in the manner shown on FIGURE 2 and the fish will when they move to the left on the drawing successively be forced towards the center line of the conduit with the wider and less resilient back portion 13 while the narrower and more resilient belly portion 14 will be pressed up between the side wall of the conduit and the external wall of the V 8, so that the belly will be on top, either to the right or to the left.

In other words, it is to be noted that plate 5 is not V-shaped from end to end but only adjacent its discharge end. As a result, a wide, flat portion of plate 5 first contacts the fish and presses over a substantial area of the fish but leaves a narrow gap on either side to which the resilient belly of the fish accommodates itself more readily than the relatively rigid back of the fish. The contact of the fish with the V-shaped portion of plate 5 subsequently progressively completes the orientation of the fish belly up.

I claim:
1. Apparatus for orienting fish, comprising a conduit that inclines downwardly toward its discharge end, means for reciprocating the downwardly inclined conduit in the general direction of its length, the conduit having progressively steeper sides towards its discharge end, and a guide plate disposed above the conduit and having a relatively flat portion adjacent its entry end and a relatively V-shaped portion adjacent its discharge end.

2. Apparatus as claimed in claim 1, and means continuously yieldably urging said guide plate toward the bottom of said conduit.

3. Apparatus as claimed in claim 1 the side edges of said plate being spaced from the adjacent side walls of the conduit.

References Cited by the Examiner
UNITED STATES PATENTS

| 1,480,898 | 1/1924 | Denmire. | |
| 2,529,800 | 11/1950 | Erickson | 17—2 |
| 2,572,316 | 10/1951 | Christiansen | 17—4 |

FOREIGN PATENTS

| 123,298 | 2/1959 | Russia. |

HUGO O. SCHULZ, Primary Examiner.
SAMUEL, F. COLEMAN, Examiner.
R. J. HICKEY, Assistant Examiner.